United States Patent [19]

Winter

[11] Patent Number: 4,473,381

[45] Date of Patent: Sep. 25, 1984

[54] METHOD FOR RECOVERING A SUBSTANTIALLY DEHYDRATED DESORBATE AS WELL AS APPARATUS FOR CARRYING OUT THE METHOD

[75] Inventor: Karl Winter, Dortmund, Fed. Rep. of Germany

[73] Assignee: CEAG Verfahrungstechnik GmbH, Selm, Fed. Rep. of Germany

[21] Appl. No.: 458,539

[22] Filed: Jan. 17, 1983

[30] Foreign Application Priority Data

Jan. 19, 1982 [DE] Fed. Rep. of Germany ....... 3201390

[51] Int. Cl.$^3$ ............................................. B01D 53/04
[52] U.S. Cl. ......................................... 55/28; 55/31; 55/33; 55/62; 55/75
[58] Field of Search ................... 55/27, 28, 31, 33, 62, 55/74, 75, 179, 180, 208, 387, 389

[56] References Cited

U.S. PATENT DOCUMENTS

| | | | |
|---|---|---|---|
| 2,790,505 | 4/1957 | Dow | 55/33 |
| 2,882,998 | 4/1959 | Grenier | 55/27 X |
| 2,995,208 | 8/1961 | Hachmuth et al. | 55/33 |
| 3,230,689 | 1/1966 | Hussmann | 55/28 |
| 3,355,859 | 12/1967 | Karwat | 55/31 X |
| 3,674,429 | 7/1972 | Collins | 55/31 X |
| 3,850,592 | 11/1974 | Huffman | 55/33 |
| 3,891,410 | 6/1975 | Hankison | 55/33 X |
| 4,030,896 | 6/1977 | Wimber et al. | 55/62 X |
| 4,183,734 | 1/1980 | Leppard et al. | 55/28 |
| 4,185,969 | 1/1980 | Balang | 55/31 |
| 4,203,734 | 5/1980 | Winter et al. | 55/27 X |
| 4,324,565 | 4/1982 | Benkmann | 55/27 X |
| 4,324,566 | 4/1982 | Jacob et al. | 55/28 |
| 4,336,159 | 6/1982 | Winter | 55/27 X |
| 4,373,935 | 2/1983 | Ausikaitis et al. | 55/33 |

FOREIGN PATENT DOCUMENTS 2702701 7/1978 Fed. Rep. of Germany .......... 55/33

*Primary Examiner*—Robert H. Spitzer
*Attorney, Agent, or Firm*—Herbert L. Lerner; Laurence A. Greenberg

[57] ABSTRACT

Method for obtaining a substantially dehydrated desorbate in the desorption of sorption materials loaded with a gaseous, recirculated desorption medium. The desorption medium is heated up in a first heat exchanger before it enters into the loaded sorption material. Desorbate is removed from the desorption medium by cooling in a second heat exchanger acting as a desorbate condenser, and water vapor is removed at least partially by adsorption in an adsorptive drier. The cooled and dried desorption medium is returned by a circulating blower to the first heat exchanger. The desorption medium before entering into the adsorptive drier, is cooled down in the initial phase of the desorption period in the desorbate condenser, first, to near the water saturation limit. The cooled-down desorption medium with the water vapor saturation which is high in this initial phase, flows toward the adsorptive drier and is subsequently heated in dry condition. In the desorption phase following the initial phase the desorption medium loaded with desorbate is cooled completely in the desorbate condenser. During the cooling phase following the desorption phase, the desorption medium which now leaves the sorption materials in hot condition flows, uncooled, toward the adsorptive drier.

12 Claims, 4 Drawing Figures

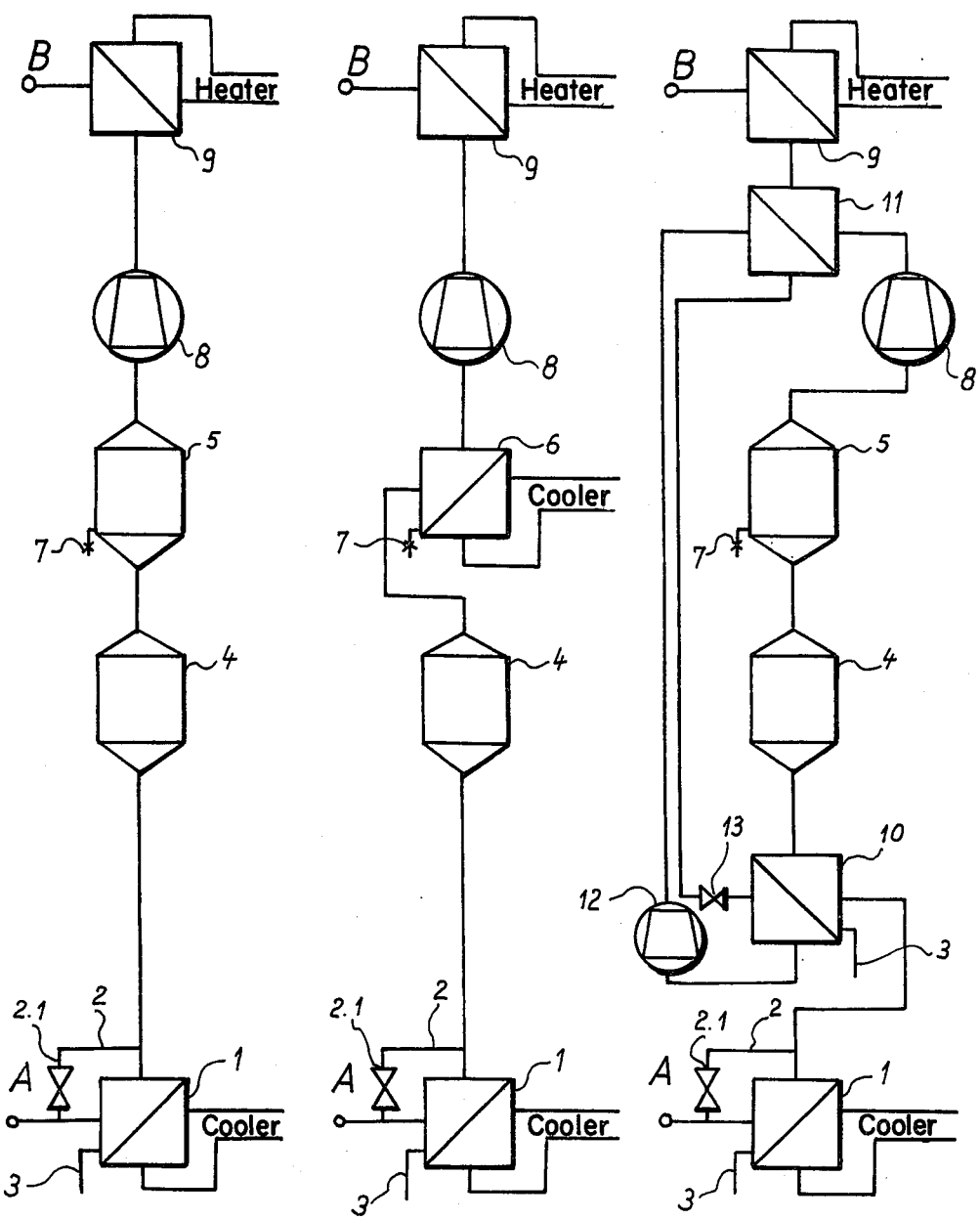

METHOD FOR RECOVERING A SUBSTANTIALLY DEHYDRATED DESORBATE AS WELL AS APPARATUS FOR CARRYING OUT THE METHOD

BACKGROUND OF THE INVENTION

1. Field of the Invention

The invention relates to a method for recovering a substantially dehydrated desorbate in the desorption of sorption materials loaded, in particular, with solvents, with a gaseous recirculated desorption medium. The desorption medium is heated in a first heat exchanger before it enters the loaded sorption material. Desorbate is removed from the desorption medium loaded with desorbate from the sorption material by cooling in a second heat exchanger operating as a desorbate condenser. Water vapor is removed from the desorption medium leaving the condenser, at least partially, by adsorption in an adsorption drier. The cooled and dried desorption medium is subsequently recirculated by a circulating blower to the first heat exchanger. In addition, the invention relates to apparatus for the advantageous implementation of the method, with a sorption medium container which is connected during the adsorption period for the purification of an exhaust air or exhaust gas stream and which is inserted for desorption into the loop of a desorption medium together with a desorbate condenser, and adsorptive drier, a heat sink, a circulating blower and a first heat exchanger.

2. Description of the Prior Art

A method is known from German Published Non-Prosecuted Application DE-OS No. 29 42 959 for recovering substances adsorbed on activated carbon, preferably solvents, by desorption with a recirculated gaseous desorption medium in which the desorption medium which leaves the adsorber to be desorbed and is loaded with desorbate, is freed of the water vapor in an adsorptive drier following the adsorber in the desorption loop and is then cooled in the desorbate condenser until the remaining desorbate is condensed. In order to recover the desorbate with a low water content, this method would require the adsorptive drier to be capable of taking up the entire quantity of the water getting into the desorption loop. One source of this water is from the generation of an inert gas by combustion, for instance by burning a hydrocarbon with air. A second source is the water present in the exhaust gas which water is adsorbed by the activated carbon in the exhaust gas purification by means of activated carbon, and from which it is later displaced, at least partially, by the impurities to be adsorbed. Both water components play a decisive role in evaluating the water accumulation during the desorption. For this reason, the adsorptive drier, in this method, must be designed to take up all the water produced in the system and released in the desorption.

Another factor which must be taken into consideration in the design of the adsorptive drier is that the temperature of the desorption medium rises toward the end of the desorption phase. This temperature rise decreases the capability of the adsorptive drier to store water vapor. If the adsorptive drier is designed too small and therefore loaded too heavily, water vapor is undesirably released prematurely. Since, according to German DE-OS No. 29 42 959, the water stored in the adsorptive drier is to be used for remoistening the activated carbon in the cooling phase, after the desorption is completed, an adsorptive drier of large design is necessary.

SUMMARY OF THE INVENTION

An object of the invention is to provide a desorption system of the above type in which the adsorptive drier can be reduced to the size necessary for remoistening the sorption material, and which can be operated economically without elaborate control techniques to recover the desorbate substantially without water.

With the foregoing and other objects in view, there is provided in accordance with the invention a method for obtaining a substantially dehydrated desorbate in the desorption of sorption material loaded with adsorbed material, in particular a solvent, and water, which comprises recirculating a gaseous desorption medium during a desorption period constituting an initial phase, a following desorption phase proper and a following cooling phase through a first heat exchanger wherein the desorption medium is heated, passing the heated desorption material in contact with the loaded sorption material to effect removal of adsorbed material and water, discharging the desorption medium containing desorbate and water from the sorption material and cooling said desorption medium in a second heat exchanger acting as a desorbate condenser to remove desorbate, passing the cooled desorption medium from the second heat exchanger to an adsorptive drier to remove water vapor from the desorption medium, at least partially, by adsorption in the drier, and recirculating the cooled and dried desorption medium from the drier to the first heat exchanger, the combination therewith wherein the desorption medium before entering the adsorptive drier is in the initial phase of the desorption operation cooled in the desorbate condenser to near the water saturation limit, wherein said cooled-down desorption medium near water vapor saturation which is high in the initial phase flows toward the adsorptive drier and is subsequently heated in dry condition, wherein in the desorption phase proper following the initial phase, the desorption medium loaded with desorbate is cooled to a low temperature to cool the adsorptive drier and retain water therein, and wherein in the cooling phase following the desorption phase proper, the desorption medium which now leaves the sorption materials in hot condition flows, uncooled, toward the adsorptive drier.

Other features which are considered as characteristic for the invention are set forth in the appended claims.

Although the invention is illustrated and described herein as embodied in a method for recovering a substantially dehydrated desorbate as well as apparatus for carrying out the method, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which:

FIG. 1 diagrammatically illustrates the flow of gaseous desorption medium in accordance with the invention. Desorption medium containing desorbate from the sorption material enters the desorption system at A and then flows through desorbate condenser provided with a bypass, adsorptive drier, heat sink, circulating blower, and heater before it leaves the desorption system at B to reenter the sorption material.

FIG. 2 shows a desorption system similar to FIG. 1 but differing particularly in that the heat sink of FIG. 1 is now designed as a cooler.

FIG. 3 is similar to FIG. 1 but has in addition a post-cooler after the desorbate condenser and a preheater before the heat exchanger for heating the desorption medium before entering the sorption material. Transfer of heat between the post-cooler and the preheater is accomplished by a heat pump.

DETAILED DESCRIPTION OF THE INVENTION

Figure 4:
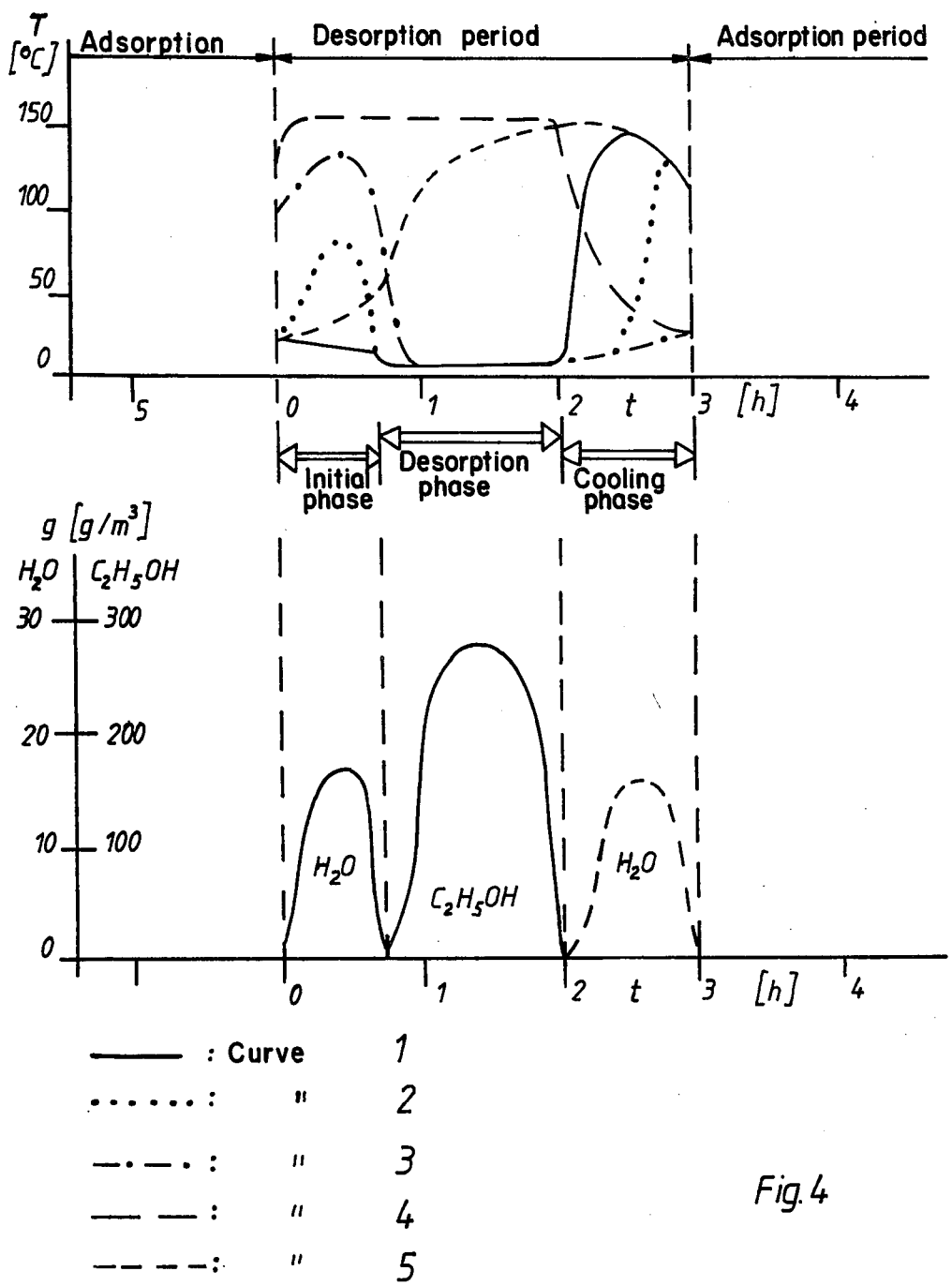
FIG. 4 shows a series of curves in which the temperatures of the desorption medium at different points in the system are plotted at different times during the desorption period. The water and $C_2H_5OH$ removed from the sorption material is shown below the first curves.

In accordance with the invention, the desorption medium is first cooled down, before entering the adsorptive drier, in the initial phase of the desorption period, in the desorbate condenser to near the water saturation limit. The cooled-down desorption medium with, in this initial phase, high water vapor saturation, flows toward the adsorptive drier and is subsequently heated in dry condition. In the desorption phase following the initial phase, the desorption medium now loaded with desorbate is completely cooled in the desorbate condenser. During the cooling phase following this desorption phase, the desorption medium which leaves the sorption materials flows toward the adsorptive drier uncooled. By controlling the process in this manner, not only is a relocation of the water effected in the initial phase of the desorption period from the activated carbon into the adsorptive drier, but that in addition, the water stored in the adsorptive drier by the desorption of the adsorptive drier, is by means of the heat stored in the sorption materials relocated during the cooling phase for moistening the activated carbon. This procedure has two substantial advantages: First, precooling of the desorption medium loaded with water during the initial phase results in a desorption medium of relatively high moisture content (near saturation), and second, the cooled desorption medium passing through the adsorptive drier also results in the adsorptive drier operating at a low temperature. Under these conditions of high moisture content in the desorption medium and low temperature of the adsorptive drier, the degree of separation of water from the desorption medium and the storage capacity of the adsorptive drier are very high. In addition, the relative moisture content of the desorption medium is lowered by the subsequent heating. The driving out of water from the sorption materials is aided due to the lowered moisture. After this initial phase is completed, the desorption proper takes place. The desorbate condenser is operated here at increased cooling capacity, generally with full cooling capacity, causing the temperature of the desorption medium flowing toward the adsorptive drier to be lowered in the process. As a consequence of lowering the temperature, the water stored in the adsorptive drier is securely retained therein and not carried out by the desorption medium. The cooling phase follows at the end of the desorption proper. During the cooling phase, the temperature of the sorption medium leaving the sorption materials rises. In this phase, the desorbate condenser no longer cools the desorption medium; it flows toward the adsorptive drier in hot condition. Through transfer of heat by contact of hot desorption medium with the adsorptive drier, the adsorptively bound water is driven out of the adsorptive drier and fed to the sorption materials. In this phase, heating of the desorption medium is not in operation, and the cooled-down desorption medium as a result of contact with the colder adsorptive drier flows toward the sorption materials which now in turn become progressively colder. The sorption materials then take from the desorption medium, the water driven out of the adsorptive drier. Since the sorption materials are not loaded, loading with water can directly take place to a sufficient degree, which goes beyond the normal moistening of 3 to 5%; the adsorption is not disturbed thereby, and excess water is removed from the sorption materials with the exhaust air or the exhaust gas.

In a further embodiment, the coolant throughput of the desorbate condenser is adjustable for changing the cooling output thereof. In addition, the stream of the desorption medium can be conducted entirely or partially past the desorbate condenser by means of an adjustable bypass. The coolant throughput of the desorbate condenser and/or the flow through the bypass are controllable for bypassing the desorbate condenser. By varying the cooling output or by adjusting the flow of the desorption medium conducted past the desorbate condenser, a reduced cooling output is available during the initial phase. That cooling no longer takes place during the cooling phase. A control may be employed to adapt the changes in the coolant throughput and/or the bypass flow of the desorption medium to the required conditions.

Adjustment or the control of the coolant throughput through the desorbant condenser and/or of desorption medium throughput through the bypass may be made as a function of the water content of the desorption medium. In addition, the temperature rise of the desorption medium after it leaves the sorption material, may be utilized as an indicator for the water content of the desorption medium. The acceptance of the water content of the desorption medium as the control variable for setting or controlling is an advantageous control variable for obtaining a water-free desorbate unless, in quasi-stationary processes, once-determined time intervals for the initial phase, desorption phase and cooling phase can be retained.

The temperature rise of the desorption medium after leaving the sorption material has been found practical as a simple indicator for the water content of the desorption medium.

In a further embodiment, the desorption medium is post-cooled between the desorbate condenser and the adsorptive drier in another heat exchanger and is preheated in a heat exchanger following the adsorptive drier, particularly in a heat exchanger following the circulating blower, where the heat transfer from the post-heating device of the desorption medium to the pre-heating device of the desorption medium takes place by means of a heat pump with a closed refrigerant loop. This proposal is particularly advantageous if the condensation heat of the desorbate, which otherwise is removed via the cooling of the desorbate condenser, is to be used to pre-heat the cooled-down desorption medium after the drying. In this process, condensate naturally accumulates in the heat exchanger operating as a post-cooler, and is discharged from the desorbate condenser and combined with the condensate discharged from the desorbate condenser. The relocation of the condensate accumulation to the post-cooler can be accomplished by reducing the cooling power of the desorbate condenser and/or by bypassing the desorbate condenser.

Apparatus for carrying out the method is characterized by the feature that the desorbate condenser is arranged between the sorption medium tank and the adsorptive drier, where the sorption medium tank is provided with an activated carbon bed and the heat sink is designed as a heat accumulator containing a gravel charge. The arrangement of the desorbate condenser between the sorption medium tank and the adsorptive drier normally results in water accumulating in the desorbate condenser in an undesired manner. Through the special process management, however, it is surprisingly possible in this arrangement to obtain desorbate substantially free of water. The reason for this is that the adsorptive drier is kept at a low temperature level during the decisive phases and thus has a large storage capacity. The recirculating desorption medium is dried well in the process; its relative moisture content is lowered considerably in the heat accumulator. In addition, the thermal energy stored in the heat accumulator is utilized.

Zeolithic molecular sieves are preferably used in the adsorptive drier as sorption material because it adsorbs water preferably. In a preferred embodiment the volume of the sorption media adsorbing water in the adsorptive drier is 18 to 15% of the volume of the activated carbon employed for the purification of the exhaust air or the exhaust gas, and the volume of the bed of gravel into the heat accumulator is approximately 15 to 35% of the volume of the activated carbon used.

The use of zeolithic molecular sieves in the adsorptive drier as the sorption medium preferably adsorbing water has the substantial advantage that the water is bound into the pore structure of this sorption medium; the larger molecules of the organic desorbates therefore cannot displace the embedded water molecules. Design ranges for the adsorptive drier or the heat accumulator given hereafter are relative to the respective volume of the activated carbon used. The use of volume ratios is justified by the fact that the density of the activated carbon and the density of the molecular sieve used depend on the loading; when giving mass ratios, this would have to be taken into consideration. The adsorptive drier in accordance with the invention can be made 50% smaller than the adsorption drier according to German DE-OS No. 29 42 959.

The design of the heat sink as a heat accumulator corresponds to the design of the heat accumulator according to German DE-OS No. 29 52 127. Here, as there, the heat accumulator serves as a heat source during the desorption phase. At the end of the desorption phase, the heat accumulator is a heat sink for the desorption medium which flows toward it at a higher temperature. The desorption medium gives off heat to the heat accumulator and during that process cools off. If utilization of the heat fed-in for the desorption of the sorption materials is dispensed with, then the heat accumulator is replaced by a cooler. In this case, the heat supplied into the system for desorption during the cooling phase is removed by means of the cooler. In either case, the desorption medium which must cool the sorption materials in this phase, is cooled off.

The essence of the invention will be explained in greater detail with the aid of the schematic process presentations according to FIGS. 1–3. The points A and B respectively indicate the connections to the sorption material tank, not shown. The process cycle will be described with the aid of FIG. 4 by way of an example of desorption of sorption materials loaded with ethanol.

In detail, FIG. 1 shows the flow of the gaseous desorption medium which, coming from the sorption material, enters the system at A. First, the desorption medium flows toward the desorbate condenser 1. A bypass 2 with an adjustable throttling valve 2.1 allows the desorbate condenser to be bypassed, whereby the volume flow bypassing the desorbate condenser can be adjusted. An adjustment of the cooling output of the desorbate condenser by adjusting the coolant throughput or the input temperature of the coolant may be provided instead of the bypass line 2. The desorption medium then flows toward the adsorptive drier 4, which contains a sorption medium, such as silica gel or molecular sieves, which preferentially separates or removes water vapor from the desorption medium.

After leaving the adsorptive drier 4, the now dry desorption medium flows to the heat sink 5, which is a heat accumulator similar to German DE-OS No. 29 52 127. In the initial phase of the desorption, this heat accumulator 5 transfers heat to the desorption medium. The circulating blower 8 then transports the gaseous desorption medium to the first heat exchanger 9, wherein the heat required for the desorption is supplied. The heated desorption medium then flows to the connection point B where it enters the sorption materials to be desorbed, and after desorbing the sorption materials discharges therefrom at point A. The desorbate condenser 1 is additionally provided with the runoff 3 for removal of the condensed desorbate collecting in condenser 1. A runoff 7 is provided for discharging condensed water from the heat sink 5.

FIG. 2 shows a flow diagram analogous to FIG. 1 except that in FIG. 2 the heat sink is designed as a cooler 6. It goes without saying that this cooling is set in operation only if the sorption materials are to be cooled in the cooling phase and the heating of the first heat exchanger 9 is switched off. Since with this arrangement, water condenses in the cooler 6, it is advisable to return the water discharged from the condenser runoff 7 to the sorption medium tank, where it can be injected by means of nozzles for moistening the activated carbon.

The third schematic process shown in FIG. 3 corresponds in substance to the preceding one. In order to utilize the condensation energy of the desorbate, a post-cooler 10 follows the desorbate condenser 1. The primary side of post cooler takes over the cooling during the desorption phase fully or partially. The accumulated desorbate condensate is drained from the primary side and discharged through the runoff 3. The secondary side of this heat exchanger 10 is inserted as an evaporator into the closed refrigerant loop of a heat pump. The refrigerant evaporated in the evaporator is fed by a compressor 12 to the heat exchanger 11 which is connected as a post-heater. On the secondary side of heat exchanger 11, the refrigerant condenses, giving off heat, and then the refrigerant discharges as a liquid from heat exchanger 11 to the expansion valve 13 shown adjacent post-cooler. The refrigerant then returns to the secondary side of the post-cooler 10, where in the decompressed state it can evaporate, absorbing heat. This heat is released as heat of condensation in the post-heater 11 and transferred to the desorption medium. In this embodiment of the method, it is particularly important that the desorption medium can be cooled to temperatures of about −5° C., since the residual water content corresponds to a dew point temperature of far below 5° C. Substantial improvement in the condensation of the desorbate as well as the storage capacity of the adsorptive drier 4 is effected through this lowering of the temperature.

To explain the method in greater detail, the purification of an exhaust air stream of 800.00 m³/h with a pollutant loading of 600 kg/h ethanol is described as a process example. A two-adsorber facility with 30 m³ activated carbon each is employed; the adsorbers are operated alternatingly in adsorption and desorption. For desorption, the adsorbers are connected in a respective desorption loop having a desorbate condenser, an adsorptive drier, a heat accumulator, a circulating blower and a first heat exchanger; the arrangement corresponds to the schematic process shown in FIG. 1. One adsorption/desorption cycle takes 6 hours; the adsorption period and the desorption period are of the same length; both take 3 hours.

FIG. 4 shows the cycle of the temperatures at different points of the desorption loop. Curve 1 shows the shape of the temperature curve of the desorption medium leaving the desorbate condenser. Curve 2 shows the shape of the temperature curve of the desorption medium leaving the adsorptive drier. Curve 3 shows the shape of the temperature curve of the desorption medium leaving the heat accumulator. Curve 4 shows the shape of the temperature curve of the desorption medium before entering into the sorption materials; and curve 5, after leaving the sorption materials. The temperature cycles can be interpreted in detail as follows: At the beginning of the desorption period, the system is inertized and heating of the first heat exchanger with saturated steam at 170° C. is switched on. The temperature of the desorption medium entering the sorption materials (curve 4) rises rapidly to about 155° C. and remains constant at this temperature. During the initial phase, water is first driven out of the sorption materials. The water concentration of the desorption medium ahead of the adsorptive drier reaches the maximum values of about 16 g/m³. After 50 min. the water concentration has declined and the initial phase is ended. During this initial phase, the temperature of the desorption medium emanating from the sorption materials (curve 5) has increased slightly; at the end of the initial phase, it reaches about 50° C. In the following desorbate condenser, the water-containing desorption medium that has left the sorption materials is cooled only slightly, (curve 1) so that the temperature at the end of the initial phase reaches about 16° C. The temperature of the desorption medium remains at about 18° C., while the water accumulation occurs at about 16 g/m³ at the maximum. The dew point temperature is here below 18° C.; the desorption medium does not fall below that temperature as can be seen from curve 1. The water driven out of the sorption materials by the desorption medium and carried by it is adsorbed in the adsorptive drier, releasing the corresponding amount of adsorption heat. As a consequence the temperature of the desorption medium (curve 2) leaving the active drier rises in the initial phase. It reaches values around 80° C. Toward the end of the initial phase, when there is no further release of adsorption heat, the temperature drops to the level of the desorption medium leaving the sorption materials: curve 2 merges into curve 1. In this initial phase, the heat accumulator which has previously been charged with heat gives off this heat to the desorption medium; the temperature curve of the desorption medium leaving the heat accumulator is represented by the curve 3. Since the heat accumulator is not fully charged by the preceding desorption, the temperature of the emanating desorption medium rises first from about 95° C. to about 135° C. and then falls again. The released adsorption heat delays the discharge of the heat accumulator. Toward the end of the initial phase, the heat accumulator is discharged and the exit temperature of the desorption medium has dropped to the temperature level of that discharged from the desorbate condenser; curve 3 merges into curve 1.

The initial phase is completed when the water has been driven out of the sorption materials. The end of the initial phase can be determined as a rule in the facilities by the time cycle. If the water accumulation is very different, it is advisable to monitor the desorption medium leaving the sorption materials. As long as water is being desorbed, the temperature of the desorption medium rises slowly; the curve reaches a bend in the range of 50° C. and then rises rapidly. This bend marks the end of the initial phase as shown by the decrease of the water content, which can be determined analytically, for instance, by IR-monitoring. The initial phase is followed by the desorption phase proper, during which the desorbate (in this case the stored ethanol) is driven out. The concentrations of the ethanol in the desorption medium prior to entering the desorbate condenser reach values of 270 g/m³. The desorption phase takes one hour, 20 minutes. During this time, the desorbate condenser is operated at the full cooling output; the temperature of the desorption medium leaving the desorbate condenser drops down to the range of +8° C. Due to this temperature which is lowered during the desorption phase, the water stored in the adsorptive dryer is retained with certainty; emission of waste and thus, an accumulation of water in the desorbate condenser is impossible. During the desorption phase, the temperature of the desorption medium entering into the sorption materials (curve 4) remains constant at about 155° C. The temperature on the exit side, which first rose to about 130° C., begins to rise more slowly in the region of the maximum desorbate accumulation as a consequence of the desorption energy to be supplied, to finally approach, according to curve 5, the temperature of the entering desorption medium of about 155° C. The end of the desorption phase is reached when the desorbate has been driven out. The heating of the first heat exchanger is turned off. A cooling phase begins, in which the sorption materials must be brought to the adsorption temperature again.

The temperature of the desorption medium entering the sorption materials drops in the cooling phase at first steeply, according to curve 4, and finally reaches the level of the adsorption temperature. Due to the heat stored in the sorption materials, the desorption medium leaving the sorption materials has at the beginning of the cooling phase a temperature which corresponds to the temperature of the desorption medium entering into the sorption materials during the desorption phase of about 155° C. (curve 5). This temperature begins to drop, slowly at first and then steeply, after a time delay. Curve 5 representing this temperature characteristic merges with the curve 1 which shows the temperature in the desorption medium after the desorbate condenser, and which rises steeply after the cooling is switched off or the bypass is completely open, and of necessity after a brief period of time equals the temperature of the desorption medium leaving the sorption materials. With progressive cooling of the sorption materials, the temperature then drops and, finally, toward the end of the cooling phase, drops below about 100° C. in accordance with curve 1. The desorption medium entering the adsorptive drier at this temperature drives water out of this drier; the necessary desorption energy is covered by its heat content. For this reason, the desorption medium leaving the adsorptive drier has a lower temperature as shown in curve 2 which toward the end of the cooling phase and thereby, toward the end of the water desorption, approaches the temperature of the desorption medium entering the adsorptive drier. The heat accumulator was heated up during the cooling phase by this heat content of the desorption medium. The desorption medium which gave up its heat to the heat accumulator mass, leaves the heat accumulator in cooled-off condition as shown in curve 3 and toward the end of the cooling phase reaches the level of the adsorption temperature. The water driven out during the cooling phase, shown in dashed lines and measured after the adsorptive drier, corresponds as to quantity to the water stored in the initial phase. This driven-out water is completely transferred back to the activated carbon.

At this temperature, 1,765 kg ethanol with a water content of less than 0.1% were recovered. This corresponds to a recovery of 98.06%. The ethanol obtained is practically free of water. Referring to the loss as emission to the purified quantity of air, a mean residual loading of less than 150 mg/m$^3$ is obtained. The water loading of the sorption media of 240 kg was returned practically completely to the activated carbon used as the sorption medium. With 30 m$^3$ activated carbon with a (dry) mass of about 10,000 kg, this means remoistening to a water content of 2.2%. For this, a molecular sieve volume of 3 m$^3$ is about adequate.

The recovery could not have been increased substantially by the additional use of a heat pump. However, at least a substantial part of the condensation energy of the 1,765 kg of ethanol would have been available as heating energy for preheating the cold desorption medium. The important difference from the process cycle described is that during the ethanol concentration the heating of the first heat exchanger could have been throttled while the condensation temperature in the desorbate condenser could have been lowered by about 10 K. The temperature of the desorption medium leaving the pre-heater would have been about 52° to 55° C. if a heat pump were used. The amount of heat including that from the drive of the heat pump, which is brought in thereby, corresponds to the amount of heat by which the heat output of the first heat exchanger could have been reduced.

There is claimed:

1. Method for obtaining a substantially dehydrated desorbate in the desorption of sorption material loaded with adsorbed material, in particular a solvent, and water, which comprises recirculating a gaseous desorption medium during a desorption period constituting an initial phase, a following desorption phase proper and a following cooling phase, through a first heat exchanger wherein the desorption medium is heated, passing the heated desorption medium in contact with the loaded sorption material to effect removal of adsorbed material and water, discharging the desorption medium containing desorbate and water from the sorption material and cooling said desorption medium in a second heat exchanger acting as a desorbate condenser to remove desorbate, passing the cooled desorption medium from the second heat exchanger to an adsorption drier to remove water vapor from the desorption medium, at least partially, by adsorption in the drier, and recirculating the cooled and dried desorption medium from the drier to the first heat exchanger, the combination therewith wherein the desorption medium before entering the adsorptive drier is in the initial phase of the desorption operation cooled in the desorbate condenser to near the water saturation limit, wherein said cooled-down desorption medium near water vapor saturation which is high in the initial phase flows toward the adsorptive drier and is subsequently heated in dry condition, wherein in the desorption phase proper following the initial phase, the desorption medium loaded with desorbate is cooled to a low temperature to cool the adsorptive drier and retain water therein, and wherein in the cooling phase following the desorption phase proper, the desorption medium which now leaves the sorption materials in hot condition flows, uncooled, toward the adsorptive drier.

2. Method according to claim 1 wherein a coolant is passed through the second heat exchanger acting as a desorbate condenser in indirect heat exchange with the desorption medium, and wherein the coolant throughput is varied to obtain a changed cooling output of the desorbate condenser.

3. Method according to claim 2 wherein the flow of the desorption medium is at least in part past the desorbate condenser by means of an adjustable bypass.

4. Method according to claim 2 wherein at least one of
   (a) the coolant throughput of the desorbate condenser and
   (b) the desorption medium throughput through a bypass are employed to control cooling in the desorbate condenser.

5. Method according to claim 4 wherein adjustment of the coolant throughput through the desorbate condenser and the desorption medium throughput through the bypass takes place as a function of the water content of the desorption medium.

6. Method according to claim 5 wherein the temperature rise of the desorption medium, after leaving the sorption material, is utilized as an indicator of the water content of the desorption medium.

7. Method according to claim 1 wherein the flow of the desorption medium is conducted at least in part past the desorbate condenser by means of an adjustable bypass.

8. Method according to claim 1, wherein the desorption medium is post-cooled in a first further heat exchanger between the desorption condenser and the adsorptive drier and wherein the desorption medium is preheated in a second further heat exchanger which follows the adsorptive drier, wherein the heat transport from, the first further heat exchanger for post-cooling the desorption medium to the second further heat exchanger for preheating the desorption medium is accomplished by means of a heat pump with a closed refrigeration loop.

9. Method according to claim 1, including a sorption medium tank, wherein the sorption material is a bed of activated carbon in the sorption medium tank, including means for connecting the sorption medium tank containing the bed of activated carbon to an exhaust gas stream for the purification of the exhaust gas stream, and means for connecting the sorption medium tank into the loop of the desorption medium, wherein the drier in the loop is followed in the direction of flow of the desorption medium by a heat sink in the form of a heat accumulator provided with a gravel bed, and the heat sink is followed by a circulating blower.

10. Method according to claim 9, wherein the volume of the sorption medium which preferably adsorbs water in the adsorptive drier occupies about 10 to 15% of the volume of the activated carbon employed for the exhaust gas purification, and wherein the volume of the gravel bed used in the heat accumulator is about 15 to 35% of the volume of the activated carbon used.

11. Method according to claim 10, wherein zeolithic molecular sieves are used in the adsorptive drier as sorption media adsorbing preferably water.

12. Method according to claim 9, wherein zeolithic molecular sieves are used in the adsorptive drier as sorption media adsorbing preferably water.

* * * * *